United States Patent
Varga et al.

(10) Patent No.: US 10,361,962 B2
(45) Date of Patent: Jul. 23, 2019

(54) PACKET PROCESSING TECHNIQUE FOR A COMMUNICATION NETWORK

(71) Applicant: TELEFONAKTIEBOLAGET L M ERICSSON (PUBL), Stockholm (SE)

(72) Inventors: Balázs Varga, Budapest (HU); János Farkas, Kecskemét (HU); Stefano Ruffini, Rome (IT)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 132 days.

(21) Appl. No.: 14/909,885

(22) PCT Filed: Nov. 9, 2015

(86) PCT No.: PCT/SE2015/051185
§ 371 (c)(1),
(2) Date: Feb. 3, 2016

(87) PCT Pub. No.: WO2017/082778
PCT Pub. Date: May 18, 2017

(65) Prior Publication Data
US 2017/0264556 A1    Sep. 14, 2017

(51) Int. Cl.
*H04L 12/26* (2006.01)
*H04L 12/851* (2013.01)
(Continued)

(52) U.S. Cl.
CPC .......... *H04L 47/2483* (2013.01); *H04L 45/38* (2013.01); *H04L 45/42* (2013.01);
(Continued)

(58) Field of Classification Search
CPC ..... H04L 47/2483; H04L 47/32; H04L 47/41; H04L 47/2441; H04L 47/34; H04L 45/42; H04L 47/283; H04L 45/38
(Continued)

(56) References Cited

U.S. PATENT DOCUMENTS 6,272,132 B1 * 8/2001 Ofek ................... H04L 12/6418
370/389
8,477,616 B1  7/2013 Rogers et al.
(Continued)

OTHER PUBLICATIONS

Draft Standard for Local and Metropolitan Area Networks—Bridges and Bridged Networks—Amendment: Frame Preemption, IEEE P802.1Qbu/D3.0, LAN/MAN Standards Committee of the IEEE Computer Society, Jul. 29, 2015.
(Continued)

*Primary Examiner* — Mang Hang Yeung
(74) *Attorney, Agent, or Firm* — Patent Portfolio Builders, PLLC

(57) ABSTRACT

A method performed by a network element that transfers first and second packet flows of the same traffic handling class comprises the step of receiving, from a network controller, information defining a relative forwarding order between first and second packet flow packets. Upon receipt, at least one ingress port of the network element, of a first and a second packet, determining that the first packet belongs to the first packet flow and the second packet to the second packet flow. The first and second packets will then be forwarded towards at least one egress port of the network element in an order defined by the information received from the network controller.

29 Claims, 10 Drawing Sheets

(51) Int. Cl.
*H04L 12/823* (2013.01)
*H04L 12/891* (2013.01)
*H04L 12/721* (2013.01)
*H04L 12/717* (2013.01)
*H04L 12/841* (2013.01)
*H04L 12/801* (2013.01)

(52) U.S. Cl.
CPC ........ *H04L 47/2441* (2013.01); *H04L 47/283* (2013.01); *H04L 47/32* (2013.01); *H04L 47/34* (2013.01); *H04L 47/41* (2013.01)

(58) Field of Classification Search
USPC .......................................................... 370/235
See application file for complete search history.

(56) References Cited

U.S. PATENT DOCUMENTS

| | | | |
|---|---|---|---|
| 2002/0065932 A1* | 5/2002 | Kobayashi | G06F 17/30902 709/233 |
| 2003/0097595 A1* | 5/2003 | Partridge | H04L 63/1408 726/4 |
| 2003/0189922 A1 | 10/2003 | Howe | |
| 2003/0231594 A1* | 12/2003 | Xu | H04L 1/1877 370/236 |
| 2005/0058149 A1 | 3/2005 | Howe | |
| 2007/0002741 A1* | 1/2007 | Vaananen | H04L 47/10 370/235 |
| 2008/0080382 A1* | 4/2008 | Dahshan | H04L 45/302 370/235 |
| 2009/0080451 A1* | 3/2009 | Gogic | H04L 47/10 370/412 |
| 2009/0168793 A1* | 7/2009 | Fox | H04L 12/5693 370/412 |
| 2011/0087800 A1* | 4/2011 | Hlibiciuc | H04M 7/0093 709/238 |
| 2011/0176423 A1* | 7/2011 | Chowdhury | H04L 47/10 370/236 |
| 2016/0110211 A1* | 4/2016 | Karnes | H04L 43/12 718/1 |

OTHER PUBLICATIONS

Draft Standard for Ethernet Amendment: Specification and Management Parameters for Interspersing Express Traffic, IEEE P802.3br/D2.2, LAN/MAN Standards Committee of the IEEE Computer Society, Aug. 12, 2015.

Draft Standard for Local and Metropolitan Area Networks—Bridges and Bridged Networks—Amendment: Enhancements for Scheduled Traffic, IEEE P802.1Qbv/D3.1, LAN/MAN Standards Committee of the IEEE Computer Society, Sep. 22, 2015.

* cited by examiner

PACKET PROCESSING TECHNIQUE FOR A COMMUNICATION NETWORK

TECHNICAL FIELD

The present disclosure generally relates to communication networks. In particular, a packet processing technique for a communication network is described in which multiple packet flows are transferred. The technique may be implemented in the form of methods, devices, networks and computer programs.

BACKGROUND

Traffic generated by time critical applications has typically been transported in proprietary dedicated networks such as Cobranet, ISO/IEC 62439, 61158 or 61784, and Avionics Full-Duplex Switched Ethernet (AFDX). Recent developments attempt to move time critical traffic to packet networks, such as Layer 2 bridged networks, that also handle other traffic with less stringent requirements. As a result of these developments, commodity Ethernet with, for example, Audio Video Bridging (AVB) is being introduced and used in industrial automation, professional audio processing and vehicular networking.

Another area in which the introduction of Layer 2 bridged networks is being considered is the fronthaul domain of mobile communication networks. The fronthaul domain connects a mobile operator's radio equipment(s) and radio equipment controller(s). This connection has technically challenging latency and Packet Delay Variation (PDV) requirements as defined, for example, by the Common Public Radio Interface (CPRI). In view of these requirements, the fronthaul domain is presently not provided by bridged networks but by dedicated lambda connections in optical networks. On the other hand, the benefits of sharing network resources by time critical traffic and other traffic would also be an interesting option for the fronthaul domain in case latency and PDV can be kept low.

One approach to reduce latency and PDV for time critical traffic is the classification of different traffic types such that time critical traffic can be transported in the communication network with a higher priority than other traffic. In the Ethernet standard, for example, eight traffic classes are defined to permit a prioritized handling of individual traffic classes.

Newer developments in the Ethernet standard permit the declaration of one of the eight traffic classes as express traffic class that receives particular treatment in an Ethernet bridge to selectively reduce packet delay for the associated traffic. For example, the draft IEEE standards 802.1Qbu "Frame Preemption" and 802.3br "Interspersing Express Traffic" suggest suspending transmission of less time critical ("preemptible") traffic to the benefit of time critical express traffic. The draft IEEE standard 802.1Qbv "Enhancements for Scheduled Traffic", on the other hand, targets at a packet delay reduction by draining transmission queues with respect to a well-defined timing. All of these draft IEEE standards relate to the egress, or output, port of a network bridge.

The terms "egress" and "output" as well as "ingress" and "input", respectively, are used interchangeably herein. Also the terms "frame" and "packet" are used interchangeably herein.

It has been found that despite the various approaches to reduce delay and PDV in communication networks, an individual packet can still suffer from significant delay, and a packet flow from considerable PDV. As an example, the race of two simultaneously received express traffic packets of different packet flows for service at network element ports can result in a significant queuing delay for the packet losing the race as they share the same resources (namely the ones dedicated to express traffic). In addition to an increase of the overall packet delay, the losing packet flow additionally suffers from PDV accumulation as the losing packet flow in essence "inherits" the PDV of the winning packet flow.

The declaration of express traffic per se can therefore not guarantee a low delay and a low PDV for each and every express traffic packet flow. For example, frame preemption cannot help solving the race condition among time critical packet flows that all belong to the express traffic class. However, if racing situations for such packet flows cannot be controlled, then additional buffering is needed to reduce the PDV. On the other hand, such additional buffering will further increase the delay experienced by the buffered packets. Similar problems occur in other situations in which different packet flows of the same traffic handling class need to be processed in a communication network.

For the above reasons, applications that are particularly time critical still have to rely on proprietary dedicated networks. This is an unsatisfactory situation because Layer 2 Ethernet bridged networks and similar networks are readily available.

SUMMARY

There is a need for a packet processing technique that avoids one or more of the disadvantages of the prior art presented above, or other disadvantages.

According to a first aspect, a method of processing packets by a network element that transfers first and second packet flows of the same traffic handling class is provided. The method comprises receiving, from a network controller, information defining a relative forwarding order between first and second packet flow packets and receiving, at at least one ingress port of the network element, a first and a second packet. The method further comprises determining that the first packet belongs to the first packet flow and that the second packet belongs to the second packet flow, and forwarding the first and second packets towards at least one egress port of the network element in an order defined by the received information.

The traffic handling class may be indicative of time critical traffic. The first and second packet flows may have the same timing constraints (e.g., in terms of prioritized ingress and/or egress processing at the network element) since they belong to the same traffic handling class.

In some cases, the relative forwarding order may be defined by at least one delay for at least one of the first and the second packet flows. The information may thus comprise delay information pertaining to packets of the first packet flow, delay information pertaining to packets of the second packet flow, or a combination thereof. It will be appreciated that in certain variants the relative forwarding order between the first and second packet flow packets can be defined by selectively delaying only the first packet flow packets or only the second packet flow packets.

The method performed by the network element may further comprise applying the at least one delay to at least one of the first and second packets. The delay may be applied prior to the forwarding step. As such, in some implementations at least one of egress processing and egress transmission of one or both of the first and second packet flow packets may selectively be delayed.

The network element may be located at any position in a communication network. As an example, the network element may be located at an edge of a transport network domain of the communication network (e.g., at an edge towards upstream network elements sending the packets). In such a case the delay can be applied to control an entry order of the first and second packets into the transport network domain. The transport network domain, in turn, may include one or more core elements in charge of transferring the first and second packet flows within the transport network domain. The network element presented herein may also take the form of such a core element.

The relative forwarding order may be defined such that it controls the absolute or relative forwarding time of the first and second packets. The forwarding may be controlled in certain variants in accordance with a timing scheme. The timing scheme may be applied locally at the network element. Alternatively, the timing scheme may be applied more globally within a transport network domain or within a larger communication network. The timing scheme may generally be defined by a local or global clocking mechanism.

In some cases, the timing scheme may be used to define ordered time slots for the first and second packets. The time slots may be applied locally at the network element or in a global manner (e.g., at a transport network domain level or at a larger communication network level). In one example, the time slots comprise at least one earlier time slot and at least one later time slot, wherein a first one of these two time slots is consistently allocated to a first packet flow packet and the second time slot is consistently allocated to a second packet flow packet. The time slots may be used to define ordered packet trains.

In one variant, the time slots immediately follow each other. In another variant, a guard interval is inserted between two successive time slots. The time slots may have the same size or different sizes.

The method presented herein may be performed by multiple network elements in a communication network. In such a case the multiple network elements may all apply the same time slot order for the first and second packets. It should be noted that the individual network elements may but need not necessarily be synchronized among each other. In such a case, one network element may apply its timing scheme in an unsynchronized manner with respect to another network element.

Each of the first and second packet flows may be a constant bitrate flow. For each constant bitrate flow, one or multiple different bitrates may be defined. The first and second packet flows may have a respective bitrate that equals a common base bitrate or that is a multiple of that common base bitrate.

The (absolute or relative) arrival times of the first and second packets at the network element may be deterministic from the perspective of at least one of the network element and the network controller. As an example, at least one of the network element and the network controller may be aware of the essential factors that influence the arrival times. Such factors may include one or more of link delays, packet flow bitrates, and so on.

The first and second packets may both be received within a time interval that is smaller than a temporal extension of at least one of the first and second packets (e.g., upon receipt via the at least one ingress port). In more general terms, the first and second packets may be received by the network element such that a race condition may occur, in particular with respect to ingress processing at the network element.

The network element may have at least two ingress ports. In such a case the first and second packets may be received via different ingress ports. Alternatively, the first and second packets may be received via a single ingress port. In the latter case the first and second packets may be received encapsulated in a single data transport entity (such as a larger higher-level packet). Additionally, or alternatively, the first and second packets may be received via a single ingress port and carry a common identifier, such as a common Virtual Local Area Network Identifier (VID).

The first and second packets may be forwarded to the same egress port of the network element. Alternatively, the first and second packets may be forwarded to different egress ports.

In some variants, two or more different traffic handling class levels may be defined. In such a case the first and second packet flows may belong to different traffic handling classes on a lower class level but to the same traffic handling class on a higher class level. In general, one, two or more lower level traffic handling classes may be mapped on a single higher layer traffic handling class. As an example, one or more of the eight Ethernet traffic classes may be mapped on the Ethernet express traffic class, which in turn constitutes the (single) traffic handling class on the higher class level.

In one implementation, at least one third packet flow having no traffic handling classification (e.g., not belonging to the Ethernet express traffic class) or a lower traffic handling classification than the first and second flows is transferred by the network element. In such a case the method may further comprise receiving a third packet at the at least one ingress port, and determining if the third packet belongs to the third packet flow. In case the third packet belongs to the third packet flow, it may be prevented from being forwarded to the egress port until the first and second packets have been forwarded to the egress port. Additionally, or in the alternative, a transmission of the third packet via the egress port ("egress transmission") may be prevented until the first and second packets have been transmitted via the egress port. The forwarding and/or transmission of the third packet may be prevented by prioritizing the forwarding and/or transmission of the first and second packets in accordance with the technique defined in at least one of IEEE 802.1Qbv, IEEE 802.1Qbu and IEEE 802.3br.

The packet flows transferred by the network element may generally constitute Ethernet layer traffic. Additionally, or in the alternative, one or more of the packet flows, in particular the first and the second packet flows, may constitute CPRI packet flows.

According to a further aspect a method of controlling packet processing by a network element that transfers first and second packet flows of the same traffic handling class is presented. The method is performed by a network controller and comprises determining information defining a relative forwarding order between the first and second packet flow packets. The method further comprises sending the information to at least one network element having at least one packet ingress port and at least one packet ingress port, wherein the information is configured to program the relative order in which the network element forwards to the egress port individual packets of the first and second packet flows received via the ingress port.

Information defining the relative forwarding order may be sent by the network controller to multiple network elements to define the same packet order throughout a communication network. The corresponding information may be identical for all network elements or different for different network elements.

As explained above, the relative forwarding order may be defined by at least one delay for at least one of the first and the second packet flow packets. The network controller may calculate the at least one delay. To this end, the network controller or any network element that communicate with the network controller is capable of measuring network delay parameters.

As an example, the at least one delay may be calculated based on a residence time of the first and second packet flow packets in the network element. Alternatively, or in addition, the at least one delay may be calculated based on one or more link delays between one or more upstream network elements sending the packets (not necessarily the packet sources) and the receiving network element. Additionally, or in the alternative, the at least one delay may be calculated based on a bitrate underlying at least one of the first and second packet flows. Alternatively, or in addition, the at least one delay may be calculated based on a packet sending time of one or more upstream network elements sending the packets. The receiving network element may generally be located at an edge of a transport network domain. The upstream network element may be located outside the transport network domain and directly interface the receiving network element.

Also provided is a computer program product comprising program code portions to perform the method and method steps presented herein when the computer program product is executed by one or more processors. The one or more processors may be located on an individual network node or may be comprised by a distributed computing system. The computer program product may be stored on a computer-readable recording medium such as a semiconductor memory, DVD-ROM, CD-ROM, and so on. The computer program product may also be provided for download via a communication connection.

According to a still further aspect, a network element configured to transfer first and second packet flows of the same traffic handling class is provided. The network element comprises an interface configured to receive, from a network controller, information defining a relative forwarding order between first and second packet flow packets. The network element further comprises at least one ingress port configured to receive a first and a second packet. Also, the network element comprises a processor configured determine that the first packet belongs to the first packet flow and that the second packet belongs to the second packet flow, and to forward the first and second packets towards the at least one egress port of the network element in an order defined by the received information.

The network element may be a Layer 2 network bridge (e.g., a Layer 2 Ethernet network bridge). Alternatively, or in addition, the network element may be an edge node of transport network domain. The network element may generally be configured to perform the steps of any of the methods and method aspects presented herein.

According to another aspect, a network controller configured to control packet processing by a network element that transfers first and second packet flows of the same traffic handling class is provided. The network controller comprises a processor configured to determine information defining a relative forwarding order between the first and second packet flow packets. The network controller further comprises an interface configured to send the information to at least one network element having at least one packet ingress port and at least one packet egress port, wherein the information is configured to program the relative order in which the network element forwards to the egress port individual packets of the first and second packet flows received via the ingress port.

The network controller may be implemented as controlling entity of a Software Defined Network (SDNc). In general, the network controller may be configured to perform the steps of any of the methods and method aspects presented herein.

A still further aspect is directed to a communication network comprising one or more network elements as presented herein and the controller as presented herein. The one or more network elements may be comprised by or interface a fronthaul domain.

BRIEF DESCRIPTION OF THE DRAWINGS

In the following, embodiments and exemplary aspects of the present disclosure will be described in more detail with reference to the drawings, in which.

DETAILED DESCRIPTION

In the following description, for purposes of explanation and not limitation, specific details are set forth, such as particular network protocols and particular network elements, in order to provide a thorough understanding of the present disclosure. It will be apparent to one skilled in the art that the present disclosure may be practiced in other embodiments that depart from these particular details.

Those skilled in the art will further appreciate that the functions, steps and services described herein may be implemented using individual hardware circuitry, using software functioning in conjunction with a programmed processor or general purpose computer, using an Application Specific Integrated Circuit (ASIC), and/or using one or more Digital Signal Processors (DSPs). It will also be appreciated that while the present disclosure is primarily described in the context of methods and devices, it may also be embodied in one or more processors and one or more memories coupled to the one or more processors, wherein the one or more memories are encoded with one or more programs that, when executed on the one or more processors, perform the functions, steps and services disclosed herein.

Figure 1:
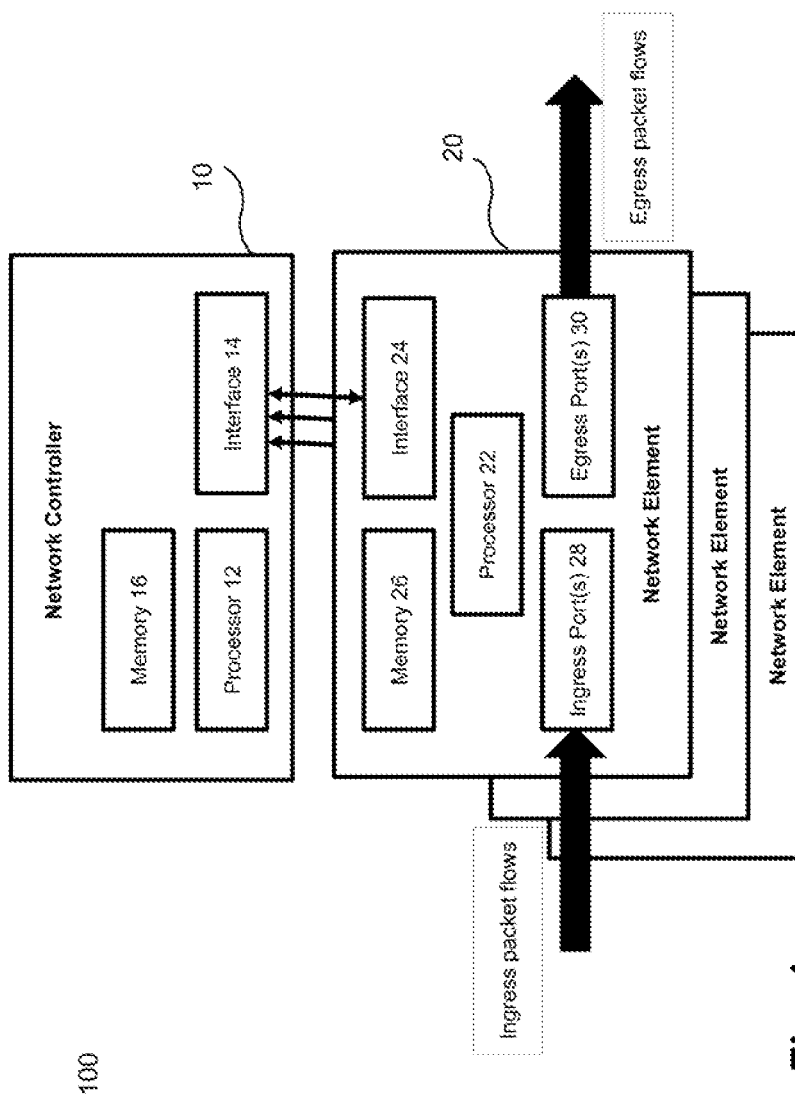
FIG. 1 illustrates an embodiment of a communication network with a network controller embodiment and one or more network element embodiments in accordance with the present disclosure.

FIG. 1 illustrates an embodiment of some components of a communication network 100. As illustrated in FIG. 1, the communication network 100 comprises a network controller 10 as well as one or more network elements 20 in communication with the network controller 10. It will be appreciated that the communication network 100 comprises additional components not illustrated in FIG. 1.

The network controller 10 of FIG. 1 is configured to control packet processing by the one or more network elements 20. To this end, the network controller 10 comprises a processor 12 and an interface 14 configured to communicate with the one or more network elements 20. The network controller 10 further comprises a memory 16 with program code that, when executed by the processor 12, configures the network controller 10 to implement the methods and method aspects of the present disclosure.

In a similar manner, each network element 20 comprises a processor 22, an interface 24 and a memory 26. The interface 24 is configured for communication with the network controller 10. The memory 26 stores program code that, when executed by the processor 22, configures the network element 20 to implement the methods and method aspects of the present disclosure.

As illustrated in FIG. 1, the network element 20 further comprises one or more ingress ports 28 as well as one or more egress ports 30. Each ingress port 28 is configured to receive one or more ingress packet flows, and each egress port 30 is configured to transmit one or more egress packet flows. The processor 22 is configured to perform ingress and egress processing operations. These processing operations may, for example, comprise Layer 2 processing (e.g., the ingress and egress packet flows may constitute Ethernet layer traffic from the perspective of a network element 20). In some variants, the network element 20 may thus be configured as a Layer 2 Ethernet bridge or switch within the communication network 100.

Figure 2B:
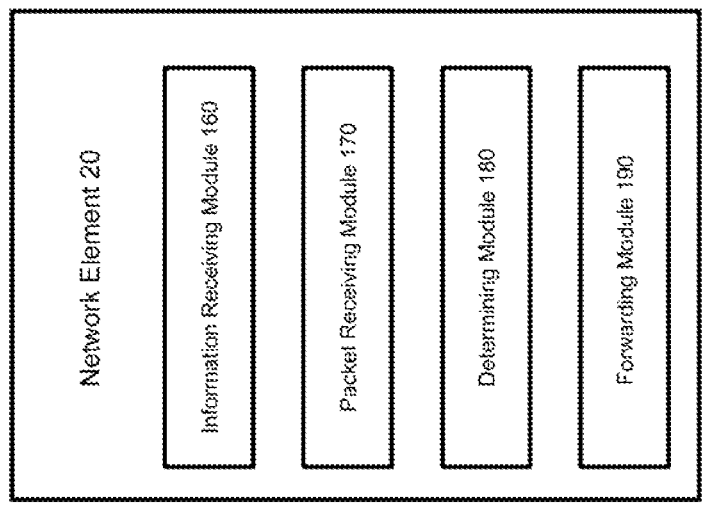
FIGS. 2A and 2B illustrate a further network controller embodiment and a further network element embodiment in accordance with the present disclosure.
Figure 2A:
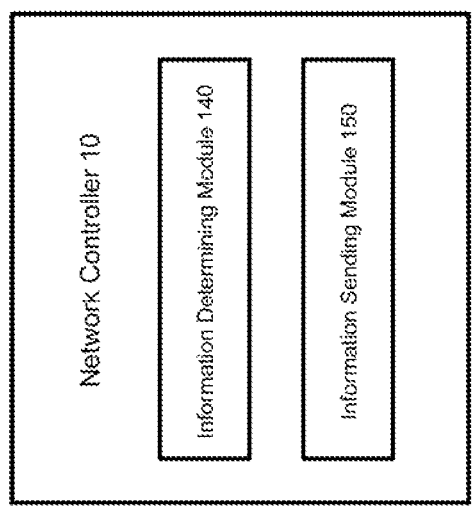

FIGS. 2A and 2B show functional embodiments of the network controller 10 and of one of the network elements 20, respectively. These functional embodiments may be based on the structural embodiments discussed above with reference to FIG. 1.

As illustrated in FIG. 2A, the network controller 10 comprises an information determining module 140 and an information sending module 150. The network element 20 comprises an information receiving module 160, a packet receiving module 170, a determining module 180 as well as a forwarding module 190.

Figure 2C:
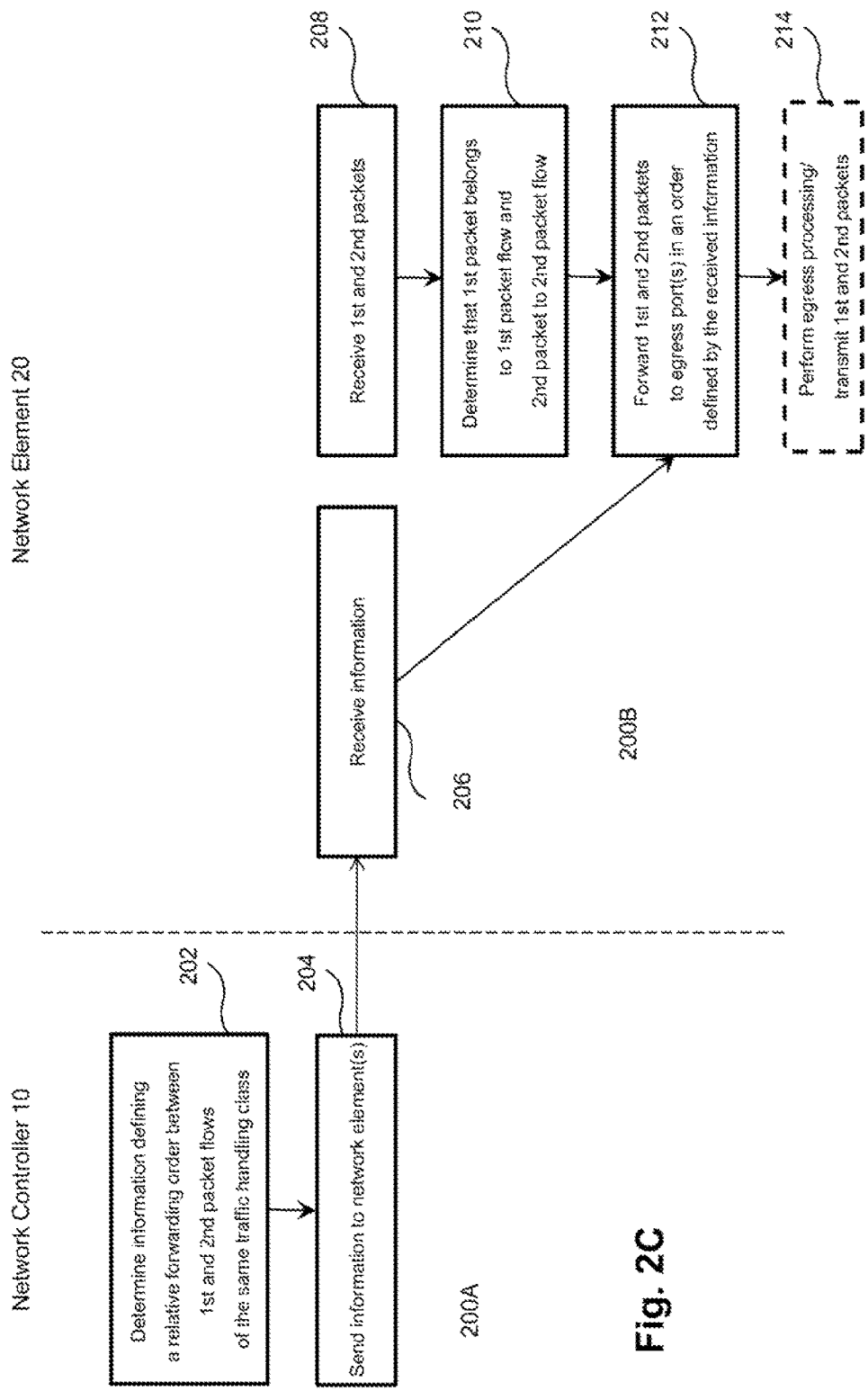
FIG. 2C illustrates flow charts of a method embodiment performed by a network controller and a method embodiment performed by a network element in accordance with the present disclosure.

FIG. 2C illustrates in two flow charts 200A, 200B exemplary method embodiments performed by the network controller 10 and an individual network element 20, respectively. The network controller 10 and the network element 20 may be configured as explained above with reference to FIGS. 1A, 2A and 2B, respectively.

The method embodiments generally target at avoiding race conditions among ingress packet flows of the same traffic handling class. This traffic handling class may in particular be a prioritising, or express, class that prioritizes time critical traffic in the communication network 100 over other ("background") traffic having less time critical constraints. As an example, the time critical traffic can be fronthaul traffic between one or more items of radio equipment and one or more radio equipment controllers. In such a scenario, the one or more network elements 20 illustrated in FIG. 1 may be located between the one or more items of radio equipment and the one or more radio equipment controllers and constitute a portion of, or the complete, fronthaul connection (e.g., in accordance with CPRI). The background traffic, on the other hand, may be any other traffic that is less time critical. It will be appreciated that the fronthaul connection is just one example, and that the present disclosure can also be implemented in other scenarios, such as industrial automation, vehicular networking, avionics, and so on.

As shown in FIG. 2C, the method performed by the network controller 10 includes a step 202 of determining information defining a relative forwarding order between two packet flows of the same traffic handling class. The forwarding order may be determined in accordance with any given requirements but may also be arbitrarily defined. What matters most is often not the order as such, but that the order is consistently implemented by an individual network element 20 and, in some cases, across multiple network elements 20.

The relative forwarding order may be defined by a delay for at least one of the packet flows. In case of n packet flows handled by an individual network element 20, at least n−1 delays may be defined. The information defining the relative forwarding order may be determined individually for each network element 20. In such a case, different delays for the same packet flow may be defined for different network elements.

The information defining the relative forwarding order may be calculated by the network controller 10 based on information derived from the communication network 100 (e.g., via measurements). The calculation may be based on one or more of a residence time of an individual packet in an individual network element 20, one or more link delays between an individual network element 20 and, for example, a network element upstream of the network element 20 sending the packets, a bitrate underlying the packet flows, and an absolute or relative packet sending time of the one or more upstream network elements.

Once the information has been determined in step 202, it is sent in step 204 by the network controller 10 to one or more of the network elements 20 to program same. With respect to FIG. 1, the information is determined by the processor 12 and the information is sent via the interface 14 of the network controller 10.

Referring now to the method performed by the network element 20, the information sent by the network controller 10 in step 204 is received by an individual network element 20 in step 206. As shown in FIG. 1, the information will be received via the interface 24 and then forwarded to the processor 22 of the network element 20 for further processing and/or stored in the memory 26.

In a further step 208, packets belonging to different packet flows are received via the one or more ingress ports 26 of the network element 20. The packets of different packet flows may be received encapsulated in a single data transport entity (such as a higher-level packet). Alternatively, or in addition, the packets of different packet flows may be identified by a common identifier, such as a common ingress port identifier or VID.

Step 208 and step 206 can be performed in any order. Typically, step 206 will precede step 208, but step 206 may be repeated multiple times while step 208 is continuously performed.

In a further step 210, the processor 22 of the network element 20 determines that a first one of the received packets belongs to a first packet flow and that a second one of the received packets belongs to a second packet flow. Step 210 can be performed in many different ways. For example, each packet may carry an identifier of a particular packet flow (e.g., in a header portion). The association between received packets and associated packet flows could thus be performed on the basis of such packet flow identifiers.

In a further step 212, the processor 22 of the network element 20 forwards the first and second packets to the one or more egress ports 30 in an order defined by the information received in step 206. The corresponding ordering in step 212 may be performed by selectively delaying the first and the second packets in accordance with the information received in step 206. As such, a delay communicated in the information received in step 206 may be applied to at least one of the first and the second packets to consistently achieve a predefined forwarding order. In this manner, race conditions with an unpredictable packet forwarding order can be avoided.

In an optional further step 214, the processor 22 applies egress processing to the packets forwarded to the one or more egress ports 30 (e.g., packet queuing) and controls a transmission of the packets (e.g., from one or more queues) via the one or more egress ports 30 to the next component in the communication network 100.

Figure 2D:
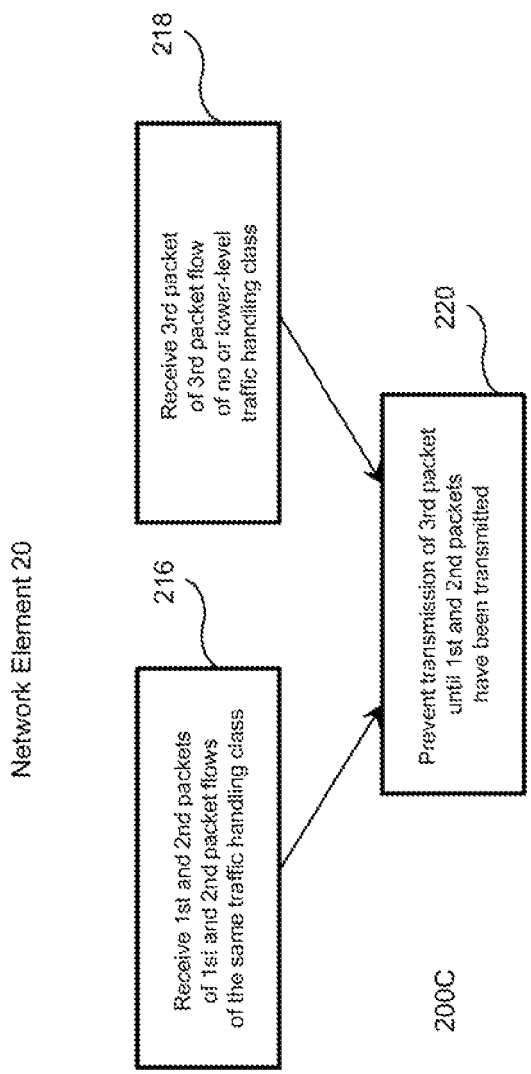
FIG. 2D illustrates a flow chart of a further method embodiment performed by one or more network elements in accordance with the present disclosure.

FIG. 2D shows a flow chart 200C of another mode of operation of the network element 20. The steps illustrated in FIG. 2D may be performed in parallel to the steps illustrated in FIG. 2C.

In step 216, the network element 20 receives first and second packets of first and second packet flows of the same (e.g., higher-level) traffic handling class. In step 218, the network element 20 receives a third packet of a third packet flow of no dedicated traffic handling class or of a lower-level traffic handling class. It will be appreciated that steps 216 and 218 can be performed in parallel.

Then, in step 220, transmission of the third packet is prevented until the first and second packets have been transmitted. The operation illustrated in FIG. 2D can, for example, be implemented to ensure that packets of prioritized packet flows received in step 216 are prioritized over background traffic such as the third packet flow received in step 218. Step 220 may thus in particular be performed at the egress port of the network element 20 in accordance with one or more of IEEE 802.1Qbv, IEEE 802.1Qbu and IEEE 802.3br.

On the other hand, the third packet of the third packet flow received in step 218 may bypass any packet delay operation performed with respect to the first and second packets in step 212 of FIG. 2C. The third packet may thus, for example, be immediately forwarded from an ingress port 28 to the egress port 30 (see FIG. 1) without any ingress-sided delay, but may then be subjected to packet preemption or a similar technique as defined in any one of the draft IEEE standards mentioned above.

In certain variants, the network element 20 illustrated in FIGS. 1, 2B, 2C and 2D may be located at an edge of a transport network domain (e.g., may constitute an edge node) towards one or more network elements that are located outside the transport network domain and that send the packets. In such a case the network element 20 may thus control an entry order of the packets of different packet flows into the transport network domain by the ordering operation in step 212. By, for example, selectively delaying the entry of packets of an individual packet flow into the transport network domain already upon entry, a racing-less transport through the transport network domain may be facilitated. Additionally, packet delay and PDV become better trackable and deterministic by the "programming" of the network element 20 by the network controller 10 via the information sent by the network element 10 in step 204. Of course, in certain variants also the core elements in the transport network domain may be programmed in this manner.

Additionally, the full communication network or the relevant packet transfer components therein may be programmed by the network controller 10 such that when a packet of the time critical packet flow is received by a given network element, it will be served and transmitted without unnecessary delay (e.g., without suffering queuing delay). In other words, time critical packet flows may be prioritized over background packet flows. As discussed above with reference to FIG. 2D, packets belonging to such background packet flows may be prevented by an individual network element 20 from being forwarded to an egress port or from being transmitted via the egress port in accordance with a technique as defined in one or more of IEEE 802.1Qbv, IEEE 802.1Qbu and IEEE 802.3br.

It has been found that the technique presented herein is particularly beneficial in connection with constant bitrate flows having bitrates that equal or are multiples of a common base bitrate. In such a case the packet arrival times for an individual packet flow and the relative packet arrival times across multiple packet flows become deterministic. Thus, application of a dedicated delay on packets of a particular packet flow may be sufficient to avoid race conditions. Of course, the corresponding delay may not only be based on the current (constant) bitrate of an individual packet flow, but could additionally take into account one or more of packet residence times at network elements, link delays and packet sending times as explained above.

The relative forwarding order may be defined (e.g., via the delays) such that it controls the forwarding of the packets in accordance with a timing scheme that is locally applied at the network element 20 or on a more scope (e.g., across a larger set of network elements 20). That timing scheme may be used to define ordered time slots for the transmission of packets from different packet flows. In particular, for each packet flow of the particular traffic handling class (e.g., the Ethernet express traffic class) a dedicated time slot may be reserved by each network element 20. In certain variants, the same time slot order for the packet flows of the same traffic handling class is applied across multiple network elements 20. The time slot concept thus particularly benefits from the packet flows being constant bitrate flows that have been derived from a common base bitrate as explained above.

It will be appreciated that the packet ordering operation may result in a certain additional delay for packets of an individual packet flow. On the other hand, PDV for all packet flows can be substantially reduced, and the PDV requirements of time critical applications are typically much more stringent than the associated delay requirements. As such, the network elements 20 can handle incoming time critical traffic (e.g., CPRI traffic) with minimal efforts in terms of de-jittering (as typically required to reduce PDV) and buffering. As such, no further latency is added to packet transport.

Additionally, the technique presented herein can easily be combined with traffic prioritization schemes such as one or more of IEEE 802.1Qbv, IEEE 802.1Qbu and IEEE 802.3br (that per se could not protect one time critical packet flow from another time critical packet flow). As such, also the impact of background packet flows on time critical packet flows can be reduced.

In the following description of further embodiments of the present disclosure, that are partially based on the embodiments discussed above with reference to the FIGS. 1 and 2A to 2D, a radio network fronthaul scenario will be discussed in more detail with reference to FIG. 3.

Figure 3:
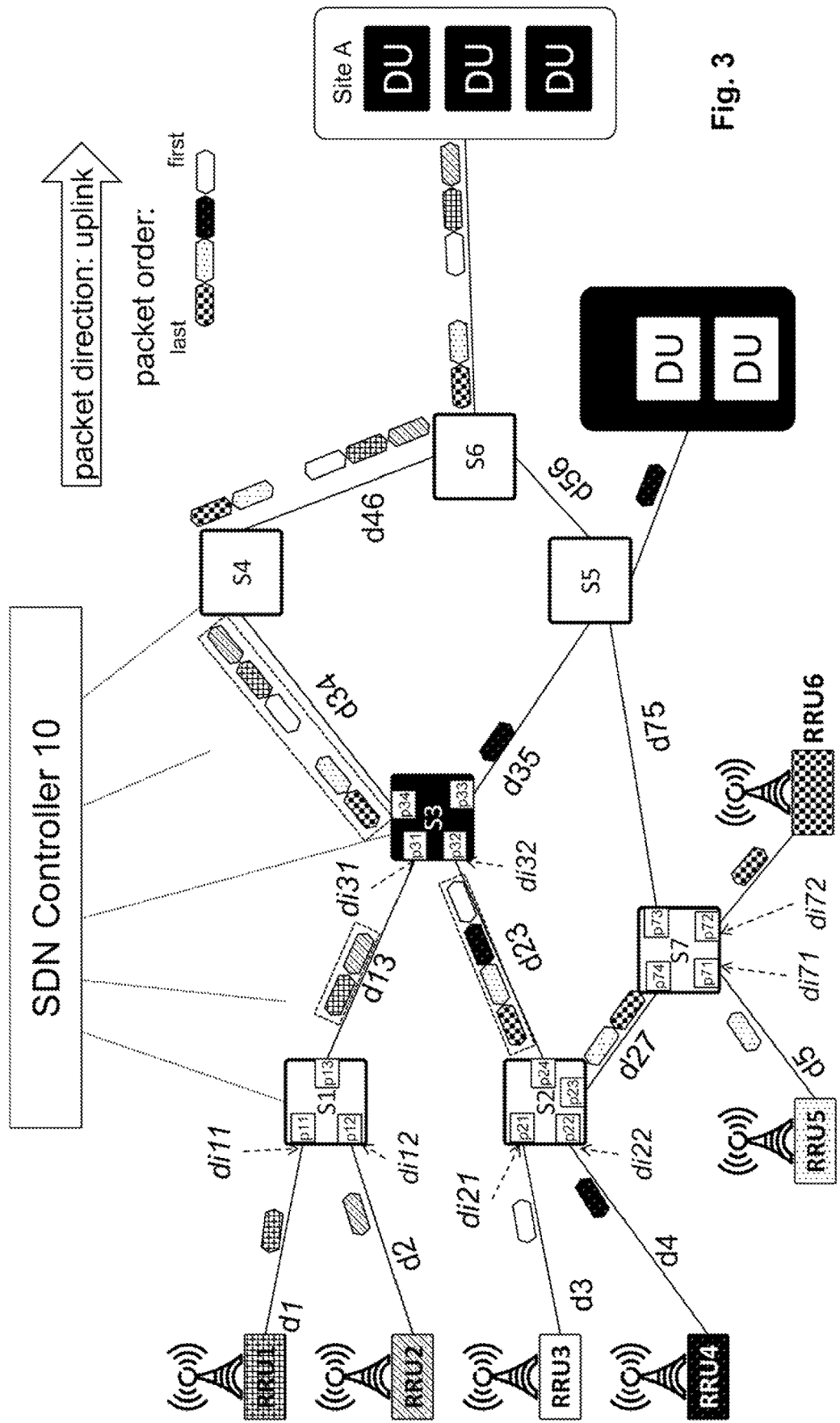
FIG. 3 illustrates another embodiment of a communication network in accordance with the present disclosure.

FIG. 3 shows an embodiment of a communication network 300 in which radio equipment in the form of so-called Remote Radio Units (RRUs) and radio equipment controllers in the form of so-called Digital Units (DUs) located at two sites A, B communicate via CPRI over an Ethernet switched transport network domain. The network elements of the transport network domain are denoted S1 to S7 and can be realized as Ethernet bridges or switches. In FIG. 3, each RRU is marked with a pattern, and exactly the same pattern is used for the packets generated by the respective RRU. As an example, the pattern is "web" for RRU1 and the packet flow generated by RRU1, and "check" for RRU6 and the packet flow generated by RRU6. FIG. 3 exemplarily illustrates uplink patent flows, but the principles presented herein are equally applicable for downlink packet flows.

In the scenario illustrated in FIG. 3, or in similar scenarios, the implementation of an ordered packet forwarding mechanism (e.g., via packet delays) and the creation of (optional) time slots can be realized for the following reasons. First, the packet flows are generated by similar sources, which means in the case of CPRI that the packet flows are constant bitrate flows with packet rates that equal, or are multiples of, a common base bitrate (e.g., 614.4 Mbps). Second, the relative packet sending times among packet flows of different RRUs are known because they generally utilize the same synchronization reference and, thus, the same timing scheme and typically send their packets simultaneously. It may therefore be assumed that all the RRUs have access to the same time synchronization reference (e.g., because they belong to the same operator, or because different radio operators have access to the same synchronization service). The RRUs (and, in general, the radio access network domain) and the network elements in the transport network (e.g., the Ethernet) domain can use different clock sources. Third, the delay to cross each link and network element in the transport network domain are known (i.e., can be measured). In the present scenario, the link delay can comprise a propagation delay and is typically determined by the length of a particular link. The delay to cross a network element corresponds to the time a packet spends to be forwarded over an individual network element and is also referred to as Residence Time (RT) herein.

Packet processing by the network elements S1 to S7 is controlled by a central network controller which, in the present embodiment, takes the form of a Software Defined Network controller (SDNc) 10. The SDNc 10 as well as the network elements S1 to S7 (denoted by reference numeral 20 in FIGS. 1 and 2B to 2D) may generally be configured to perform the method steps discussed above with reference to FIGS. 2C and 2D. As such, the SDNc 10 may determine information defining the relative forwarding order between the packet flows and may use that information to program adjustable delay parameters and/or other parameters per packet flow at the network elements S1 to S7.

Depending on the use case, only the network elements at an edge of the transport network domain may need to be programmed, or each network element of the transport network domain. In the examples described below with reference to FIG. 3, it will be assumed that an ingress delay is applied at each network element S1 to S7 (i.e., each hop) to ensure a consistent packet forwarding order for multiple packet flows of the same traffic handling class and to avoid racing in output queues of the network element S1 to S7. The racing situation at the next hop is solved in the same way by an appropriately selected ingress delay.

Each RRU generates a similar CPRI packet flow (e.g., they have the same constant bitrate). Moreover, it will be assumed that each packet flow is encapsulated in Ethernet frames having the same size. These assumptions simplify the usage of time slots as they can also have the same size. However, these are optional features.

It should be noted that an Ethernet network is an asynchronous network, so that, for example, the start time of a particular time slot is not bound to an explicit point in time but is relative to other time slots. As understood herein, a time slot corresponds to a particular time interval for packet forwarding towards one or more egress ports. A time slot may immediately be followed by another time slot, or a guard interval may be provided between two succeeding time slots (e.g., to guard against timing inaccuracies in the communication network 300).

The network topology illustrated in FIG. 3 represents a typical fronthaul deployment. In such deployments, often a comparatively simple topology (e.g., a tree structure, a partial mesh structure, limited hop counts, etc.) will be used due to the stringent synchronization and latency requirements of CPRI. The topology of the transport network domain in FIG. 3 comprises three network elements S1, S2 and S7 that constitute edge nodes as well as four network elements S3, S4, S5 and S6 that constitute core nodes of the transport network domain.

Each of the network elements S1 to S7 comprises one or more ingress ports as well as one more egress ports (see also FIG. 1). The ports of an individual network element S1 to S7 in the transport network domain are continuously numbered. For example, network element S1 comprises ports p11, p12 and p13, wherein ports p11 and p12 are configured as ingress ports and port p13 is configured as egress port in the uplink processing scenario illustrated in FIG. 3. The SDNc 10 is configured to program each of the network elements S1 to S7 with information (i.e., a delay value) defining a relative forwarding order between packets of different packet flows as explained above. The ingress delay value set by the SDNc 10 for a particular network element S1 to S7 is denoted by dikm, where km is the port number (e.g., di11 for ingress port p11 of network element S1). As such, the ingress delay may be determined and set on a per ingress port basis and/or a per packet flow basis.

The links depicted in FIG. 3 have their transmission delay denoted by di if the link connects an RRU to one of the network elements S1, S2 and S7 at the edge of the transport network domain, where i identifies a particular RRU. The links have their transmission delay denoted by dij for links between the individual network elements S1 to S7, where i and/identify the two interconnected network elements S1 to S7. Link delay measurements can be performed using standardized approaches such as IEEE 1588 Peer Delay Measurement.

Figure 4:
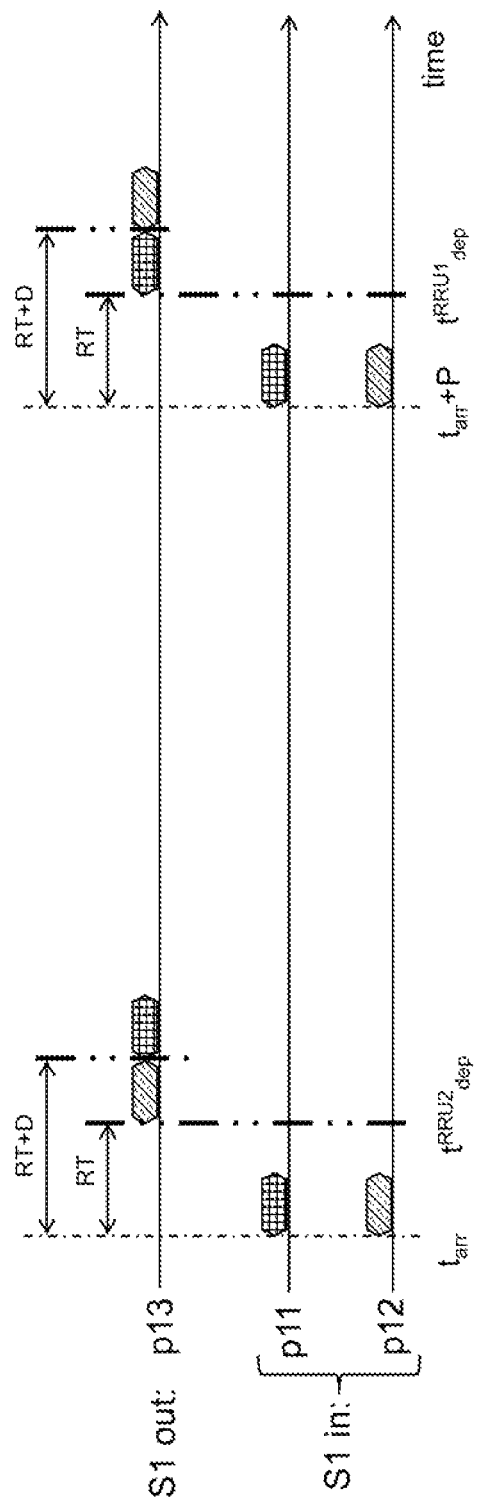
FIG. 4 is a schematic time diagram illustrating a race condition among two packets of different packet flows in the network of FIG. 3.

In the following, the occurrence of an exemplary racing situation between packets of two different packet flows from RRU1 and RRU2, respectively, at network element S1 will be explained with reference to the schematic time diagram of FIG. 4. FIG. 4 thus illustrates the scenario in which the ordered packet forwarding mechanism presented herein is not applied.

In the scenario of FIG. 4 it will be assumed that the RRUs create periodic traffic with the same constant bitrate with a time period P between two subsequent packets of a particular packet flow. Exemplarily assuming that d1 equals d2, the packets of RRU1 and RRU2 arrive at the ingress ports p11 and p12 of network element S1 at the same time $t_{arr}$. Ingress ports p11 and p12 are User Network Interface (UNI) ports of network element S1. The packet from RRU2 is sent out by the egress port p13 after the residence time RT, and the packet from the RRU1 is sent out the packet service time (denoted D) later. The departure time of the packet from RRU2 $t^{RRU2}_{dep}$ thus precedes the departure time $t^{RRU1}_{dep}$ of the packet from RRU1. However, this order among the packets from RRU1 and RRU2 is unpredictable as illustrated for the subsequent packets arriving at $t^{arr}$+P, where $t^{RRU1}_{dep}$ precedes $t^{RRU2}_{dep}$. This racing situation results in an unpredictable network behaviour and in PDV increases that are not tolerable for time critical packet flows such as the exemplary CPRI packet flows of FIG. 3.

To avoid the racing situation illustrated in FIG. 4, the network elements S1 to S7 are configured to take into account information defining a relative forwarding order between the packet flows from different RRUs as generally explained with reference to FIG. 2C above. In the present, exemplary scenario, the relative forwarding order between different packet flow packets is defined by a programmable ingress delay at the ingress ports of the network elements S1 to S7.

Figure 5:
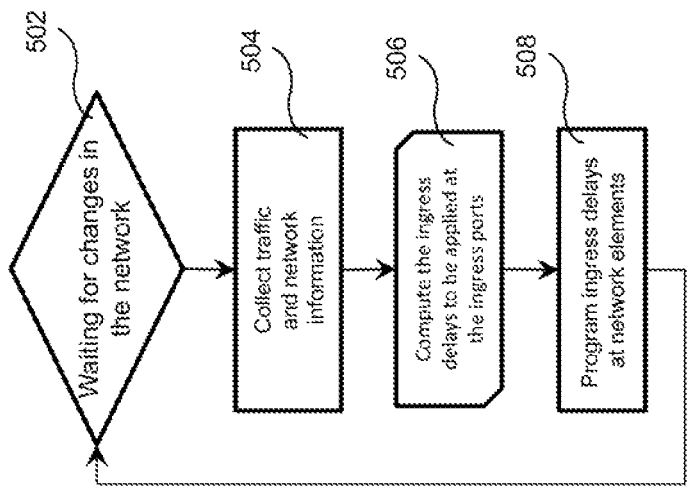
FIG. 5 is a flow chart illustrating a further method embodiment of the present disclosure.

The ingress delays are determined on a per ingress port basis by the SDNc 10 as illustrated in the flow chart 500 of FIG. 5.

At an initial step 502, the SDNc 10 waits for a change in the communication network of FIG. 3, including an initial network setup. Then, in step 504, traffic and network information are collected, including, for example, one or more of the parameters di, dikm, RT, P, and so on.

In step 506, the ingress delays to be applied at the ingress ports of the network elements S1 to S7 are calculated per traffic flow. Step 506 generally corresponds to step 202 in FIG. 2C. In a further step 508, the ingress delays determined at step 506 are programmed at the networks elements S1 to S7. Step 508 generally corresponds to step 204 in FIG. 2C.

The programming in step 508 is performed such that the ingress delay of a particular ingress port is set for a particular packet flow such that the packet order of different packet flows of the same traffic handling class (and, optionally, the relative time difference) are assured to remain always the same at the particular network element S1 to S7. For example, the "cross-hatch" packets of RRU2 are forwarded such that they are always transmitted before the "web" packets of RRU1 by egress port p13 of network element S1 as shown in FIG. 3 on the link between network elements S1 and S3.

The ingress delays may be programmed on the network elements S1, S2, S7 at the edge of the transport network domain (i.e., the first hop nodes) such that a "train of packets" is formed if flows of two or more RRUs are aggregated (see the train of packets transmitted by egress port p13 of network element S1). By using ordered time slots it can be assured that packets of a particular packet flow (from one of the RRUs or DUs) always take the same place within the train output by a particular egress port, which may apply to each egress port of the transport network domain.

Figure 6:
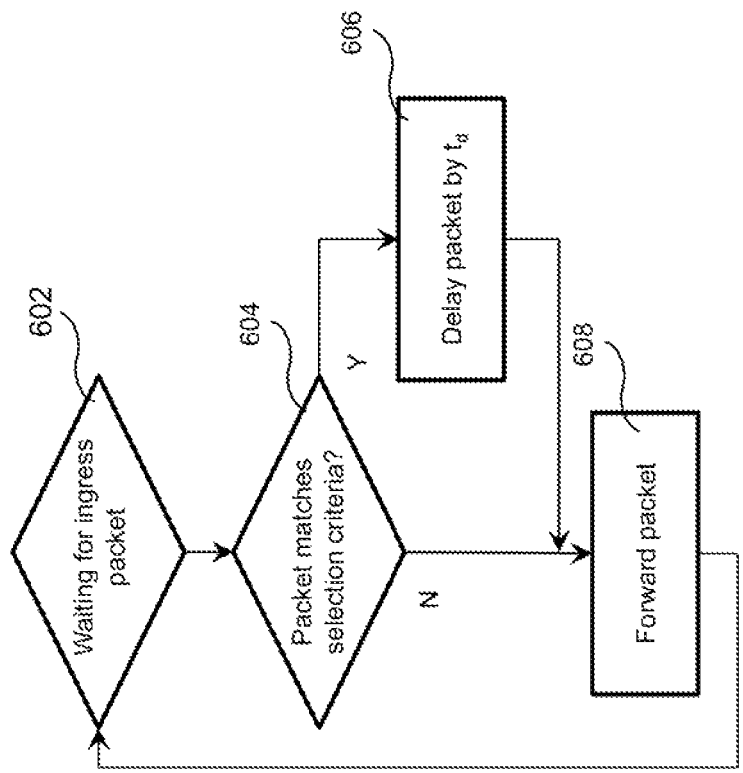
FIG. 6 is a flow chart illustrating a still further method embodiment of the present disclosure.

FIG. 6 shows a flow chart 60 that illustrates in more detail a method of applying an ingress delay to individual packets at one of the network elements S1 to S7.

As shown in FIG. 6, initially a particular network element S1 to S7 waits for a new packet on an ingress port (step 602). When a new packet is received, it is checked in step 604 against one or more selection criteria. The selection criteria may include one or more of a particular flow identifier, a particular traffic handling class, and so on. Step 604 corresponds to aspects of step 210 in FIG. 2C.

If the one or more selection criteria are found to be met, the method proceeds to step 606 and delays the received packet by a pre-defined time interval $t_d$ before continuing with step 608. The ingress delay $t_d$ generally means that if a packet is received, then its further processing in each of the network elements S1 to S7 starts only after it has been delayed by $t_d$. Step 606 generally corresponds to aspects of step 212 in FIG. 2C. If the selection criteria are not met, the method proceeds from step 604 directly to step 608.

In step 608, the packet is forwarded towards the egress port. As an example, the packet may be placed in a transmission queue on the egress side of the corresponding network element S1 to S7. Step 608 generally corresponds to aspects of step 212 and, optionally, step 214 of FIG. 2C.

Ingress delays can be used on all ingress ports (UNI ports and Ethernet transport internal trunks). Additional approaches such as IEEE 802.1Qbv, IEEE 802.1Qbu and IEEE 802.3br can be used to ensure that time critical packets can be transported over the respective network element S1 to S7 without any (further) delay and that packets belonging to time critical traffic take preference over background traffic.

As explained above, the ingress delay may be used to "push" each received packet to its dedicated position within set of ordered time slots. As such, the arrival time of the packets at the next network element (i.e., S3 and S5 in FIG. 3) become deterministic.

In the following, the advantages achievable using the ingress delay mechanism described above will be explained in more detail with reference to the exemplary communication network of FIG. 3 and the time diagrams illustrated in FIGS. 7 and 8.

Figure 7:
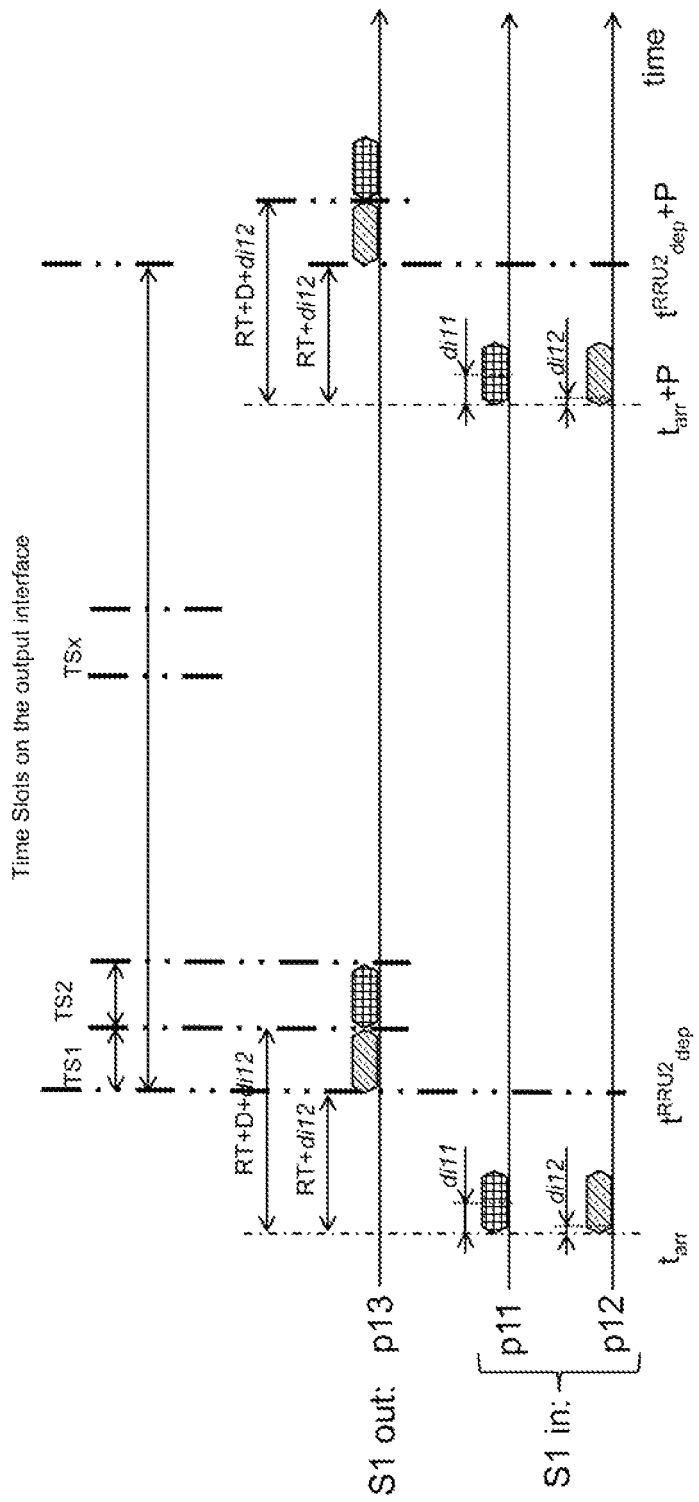
FIGS. 7 and 8 are schematic time diagrams illustrating packet processing embodiments in accordance with the present disclosure.

In the scenario illustrated in FIG. 7, packets of RRU1 and RRU2 again arrive at the same time $t_{arr}$ at ingress ports t11 and p12 of network element S1, respectively. Different from the scenario illustrated in FIG. 4, the ingress ports p11 and p12 of network element S1 implement the ingress delaying mechanism discussed above. As shown in FIG. 7, the ingress delay is set to di11 at ingress port p11 and to di12 at ingress port p12. The delay could in certain variants also be zero for at least one of the ingress ports (or one of the packet flows if multiple packet flows arrive at the same ingress port).

As explained above, the delays are set by the SDNc 10 taking into account the characteristics of the packet flows and certain network parameters. For example, if the RRUs have constant bitrate packet flows and they send the packets at the same time, then the value to be used for the ingress delay at a particular ingress port depends—in the scenario of FIG. 7—on the link delays d1 and d2 as well as on the desired packet order. If the link delays are the same (i.e., if d1 equals d2), and if the goal is to send out the packets of RRU2 before the packets of RRU1, then di11 has to be set greater than di12 (i.e., di11>di12, wherein di11<D), which always ensures the packet order and time slot arrangement illustrated in FIG. 7.

Thus, the delay values di11 and di12 may be set to achieve order time slots as illustrated in the upper portion of FIG. 4. Specifically, the time slots are set such that packets from RRU1 are always transmitted in the first time slot TS1 while packets from RRU2 are always transmitted in the following second time slot TS2.

Figure 8:
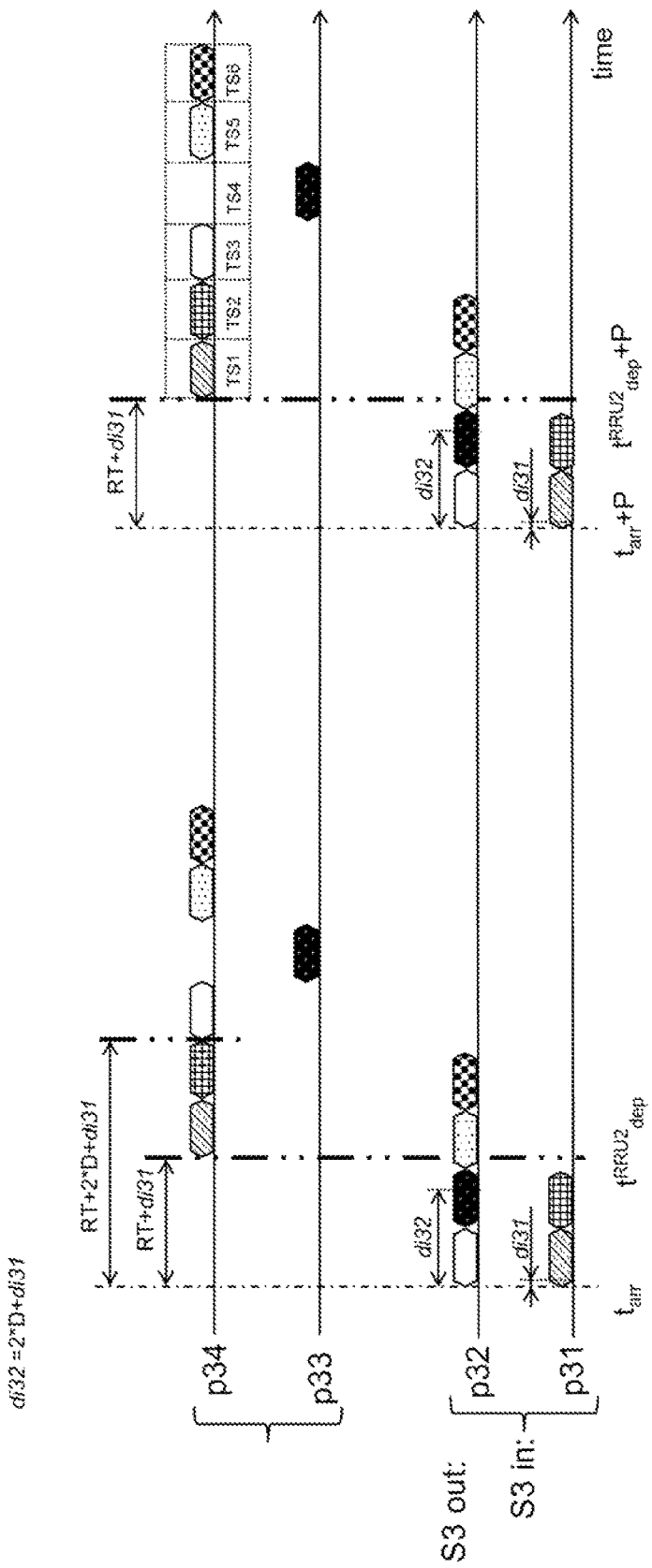

FIG. 8 exemplarily illustrates the operation of the network element S3. As shown in FIG. 3, network element S3 is a core node of the transport network domain. It implements the ingress delaying mechanism presented herein at its two ingress interfaces p31 and p32.

Network element S3 aggregates six time critical packet flows, but forwards the packet flows to different egress ports. That is, five packet flows are forwarded to egress port p34, while one packet flow is forwarded to egress port p33.

Initially, network element S3 receives the already ordered packets of RRU2 and RRU1 at ingress port p31 (see also FIG. 7), whereas the already ordered packets of RRU3, RRU4, RRU5 and RRU6 are received at ingress port p32. Network element S3 has to assure that the order between these two trains of packets is maintained such that packets of RRU2 and RRU1 are always sent out before the rest of the packets on egress port p34. For this reason, the ingress delay di32 of ingress port p32 has to be set such that the packets of ingress port p32 are delayed until the second packet of ingress port p31 is already being served by the corresponding egress port. If the two trains of packets arrive at the same time $t_{arr}$ at network element S3, then, for example, di31 may be set to zero and di32 may be set such that D<di32<2*D. As explained above, the SDNc 10 is aware of the link delays throughout the entire communication network, including d13 and d32. Therefore, SDNc 10 can determine and set di31 and di32 as explained above.

Due to the packet ordering discussed with reference to FIG. 8, the packets of the time critical packet flows form a train of packets in which each packet of each packet flow always takes the same place, which can be interpreted as the packets having dedicated time slots. It will be understood that the time slots are "virtual" entities and in essence describe a particular order among packets from different packet flows. In the example illustrated in FIG. 8, time slot TS1 belongs to RRU2, and so on.

It should be noted that depending on the traffic situation, the packets need not necessarily build trains inside the communication network. For example, in the scenario of FIG. 8 time slot TS4 is left empty to show that the "black" packets of RRU4 take a different egress port p33. This could lead to vacancies in the train of outgoing packets. If desired, such vacancies can be eliminated by changing the mapping of packet flows to time slots (e.g., by changing the order of packets in the packets train arriving at ingress port p32 such that the "black" packet of RRU4 is the last packet in the train).

As has become apparent from the above description of exemplary embodiment, the disclosure presented herein can be used to minimize PDV of packet flows of the same traffic handling class by defining a relative order between individual packet flow packets. If desired, the packet flows may be mapped to time slots using an ingress delay mechanism. The use of time slots may be helpful to create trains of packets with a consistent packet order in terms of the associated packet flows.

While the present disclosure has been described in relation to exemplary embodiments, it is to be understood that this disclosure is only illustrative. Accordingly, it is intended that the invention be limited only by the scope of the claims appended hereto.

The invention claimed is:

1. A method of processing packets by a network element, of multiple network elements in a communication network, that transfers first and second packet flows of a same traffic handling priority, the method comprising:
   receiving, from a network controller, information defining a relative forwarding order between the first and second packet flows of the same traffic handling priority, wherein the information defining the relative forwarding order is also received at the multiple network elements to define a same packet order throughout the communication network;
   receiving, by at least one ingress port of the network element, a first packet and a second packet, wherein the first and second packets are received via a single ingress port, and the received first and second packets are encapsulated in a single data transport entity or carry a common identifier;
   determining that the first packet belongs to the first packet flow and that the second packet belongs to the second packet flow;
   forwarding the first and second packets towards at least one egress port of the network element in the relative forwarding order defined by the received information, wherein the relative forwarding order is defined by at least one pre-calculated time delay for at least one of the first and second packet flows; and
   applying the at least one pre-calculated time delay to at least one of the first and second packets prior to the forwarding step.

2. The method of claim 1, wherein the network element is located at an edge of a transport network domain, and wherein the at least one pre-calculated time delay is applied to control an entry order of the first and second packets into the transport network domain.

3. The method of claim 1, wherein the relative forwarding order is defined such that the relative forwarding order controls the forwarding of the first and second packets in accordance with a timing scheme.

4. The method of claim 3, wherein the timing scheme is used to define ordered time slots for the first and second packets.

5. The method of claim 4, wherein the method is performed by the multiple network elements in the communication network, and wherein the multiple network elements all apply a same time slot order for the first and second packets.

6. The method of claim 1, wherein each of the first and second packet flows is a constant bitrate flow.

7. The method of claim 6, wherein the first and second packet flows have a respective bitrate that equals or is a multiple of a common base bitrate.

8. The method of claim 1, wherein arrival times of the first and second packets at the network element are deterministic from the perspective of at least one of the network element and the network controller.

9. The method of claim 1, wherein the first and second packets are both received within a time interval that is smaller than a temporal extension of at least one of the first and second packets.

10. The method of claim 1, wherein the network element has at least two ingress ports.

11. The method of claim 1, wherein the first and second packets are forwarded to a same egress port.

12. The method of claim 1, wherein two or more different traffic handling priority levels are defined, and wherein the first and second packet flows belong to different traffic handling priorities on a lower priority level and to the same traffic handling priority on a higher priority level.

13. The method of claim 1, wherein at least one third packet flow having no defined traffic handling priority or a lower traffic handling priority than the first and second packet flows is transferred by the network element, and the method further comprises:
   receiving a third packet at the at least one ingress port;

determining that the third packet belongs to the at least one third packet flow; and performing at least one of the following steps:

preventing a forwarding of the third packet to the at least one egress port until the first and second packets have been forwarded to the at least one egress port, and preventing a transmission of the third packet via the at least one egress port until the first and second packets have been transmitted via the at least one egress port.

14. The method of claim 1, wherein the first and second packet flows constitute Ethernet layer traffic.

15. A method, implemented by a network controller, of controlling packet processing by a receiving network element that receives and transfers first and second packet flows of a same traffic handling priority, the receiving network element having at least one packet ingress port and at least one packet egress port, the method comprising:

determining information defining a relative forwarding order between the first and second packet flow packets of the same traffic handling priority; and sending the information to the receiving network element, wherein the information is configured to program the relative forwarding order in which the receiving network element forwards to the at least one packet egress port, individual packets of the first and second packet flows received via the at least one packet ingress port, wherein the information defining the relative forwarding order is also sent to multiple network elements to define a same packet order throughout a communication network, and wherein the relative forwarding order is defined by at least one pre-calculated time delay for at least one of the first and second packet flow packets.

16. The method of claim 15, further comprising calculating the at least one pre-calculated time delay based on:

one or more link delays between one or more upstream network elements sending the individual packets and the receiving network element.

17. The method of claim 16, wherein the receiving network element is located at an edge of a transport network domain, and the one or more upstream network elements are located outside the transport network domain and directly interface the receiving network element.

18. The method of claim 15, further comprising calculating the at least one pre-calculated time delay based on at least one of:

a bitrate underlying at least one of the first and second packet flows; and a packet sending time of one or more upstream network elements sending the individual packets.

19. A computer program product comprising a non-transitory computer-readable recording memory configured to store program code portions to perform the following steps when the program code portions are executed by one or more processors of a network controller:

controlling packet processing by a receiving network element that receives and transfers first and second packet flows of a same traffic handling priority, the receiving network element having at least one packet ingress port and at least one packet egress port, said controlling step including:

determining information defining a relative forwarding order between the first and second packet flow packets of the same traffic handling priority; and sending the information to the receiving network element, wherein the information is configured to program the relative forwarding order in which the receiving network element forwards to the at least one packet egress port, individual packets of the first and second packet flows received via the at least one packet ingress port, wherein the information defining the relative forwarding order is also sent to multiple network elements to define a same packet order throughout a communication network, and wherein the relative forwarding order is defined by at least one pre-calculated time delay for at least one of the first and second packet flows, and the controlling step further comprises causing the receiving network element to apply the at least one pre-calculated time delay to at least one of the first and second packets prior to the forwarding step.

20. A network element, of multiple network elements in a communication network, configured to transfer first and second packet flows of a same traffic handling priority, the network element comprising:

an interface configured to receive, from a network controller, information defining a relative forwarding order between the first and second packet flows of the same traffic handling priority, wherein the information defining the relative forwarding order is also received at the multiple network elements to define a same packet order throughout the communication network;

at least one ingress port configured to receive a first packet and a second packet, wherein the first and second packets are received via a single ingress port, and the received first and second packets are encapsulated in a single data transport entity or carry a common identifier; and a processor configured to determine that the first packet belongs to the first packet flow and that the second packet belongs to the second packet flow and to forward the first and second packets towards at least one egress port of the network element in the relative forwarding order defined by the received information, wherein the relative forwarding order is defined by at least one pre-calculated time delay for at least one of the first and second packet flows, and the network element is further configured to apply the at least one pre-calculated time delay to at least one of the first and second packets prior to forwarding the first and second packets towards the at least one egress port.

21. The network element of claim 20, wherein the network element is a Layer 2 network bridge.

22. The network element of claim 20, wherein the network element is an edge node of a transport network domain.

23. A network controller configured to control packet processing by a network element that transfers first and second packet flows of a same traffic handling priority, the network controller comprising:

a processor configured to determine information defining a relative forwarding order between the first and second packet flow packets of the same traffic handling priority; and an interface configured to send the information to the network element having at least one packet ingress port and at least one packet egress port, wherein the information is configured to program the relative forwarding order in which the network element forwards to the at least one packet egress port, individual packets of the first and second packet flows received via the at least one packet ingress port, wherein the information defining the relative forwarding order is also sent to multiple network elements to define a same packet order throughout a communication network, and wherein the relative forwarding order is defined by at least one pre-calculated time delay for at least one of the first and second packet flows, and the information is further configured to cause the network element to apply the at least one pre-calculated time delay to at least one of the first and second packets prior to forwarding the first and second packets towards the at least one packet egress port.

24. The network controller of claim 23, wherein the network controller is implemented as a controlling entity of a Software Defined Network (SDN).

25. The network controller of claim 23, wherein the processor is further configured to determine the at least one pre-calculated time delay based on a residence time of an individual packet in the network element.

26. The network controller of claim 23, wherein the processor is further configured to determine the at least one pre-calculated time delay based on one or more link delays between the network element and another network element upstream of the network element.

27. The network controller of claim 23, wherein the processor is further configured to determine the at least one pre-calculated time delay based on a bitrate underlying the first and second packet flows.

28. The network controller of claim 23, wherein the processor is further configured to determine the at least one pre-calculated time delay based on an absolute or relative packet sending time of one or more network elements that are upstream of the network element.

29. The network controller of claim 23, wherein the processor is further configured to determine a pre-calculated time delay for another network element for at least one of the first and second packet flows that is different than the at least one pre-calculated time delay of the network element for at least one of the first and second packet flows.

* * * * *